(12) United States Patent
Sasaki (10) Patent No.: US 7,511,763 B2
(45) Date of Patent: Mar. 31, 2009

(54) VIDEO-AUDIO PROCESSOR SYSTEM, AMPLIFIER DEVICE, AND AUDIO DELAY PROCESSING METHOD

(75) Inventor: Takashi Sasaki, Kanagawa (JP)

(73) Assignee: Sony Corporation (JP)

( * ) Notice: Subject to any disclaimer, the term of this patent is extended or adjusted under 35 U.S.C. 154(b) by 583 days.

(21) Appl. No.: 11/180,739

(22) Filed: Jul. 13, 2005

(65) Prior Publication Data

US 2006/0012710 A1 Jan. 19, 2006

(30) Foreign Application Priority Data

Jul. 16, 2004 (JP) ............................. P2004-209658

(51) Int. Cl.
*H04N 9/475* (2006.01)
(52) U.S. Cl. ........................ 348/515; 348/512
(58) Field of Classification Search ................ 348/515, 348/512, 513; *H04N 9/475*
See application file for complete search history.

(56) References Cited

U.S. PATENT DOCUMENTS 6,285,405 B1 * 9/2001 Binford et al. .............. 348/512
6,906,755 B2 * 6/2005 Lundblad et al. ............ 348/515
2003/0179317 A1 * 9/2003 Sigworth ..................... 348/515
2005/0019020 A1 * 1/2005 Sato et al. ...................... 386/96

FOREIGN PATENT DOCUMENTS

| JP | 07-059030 A | 3/1995 |
|---|---|---|
| JP | 2002-290932 A | 10/2002 |
| JP | 2004-104554 A | 4/2004 |
| JP | 2004-104658 A | 4/2004 |

* cited by examiner

*Primary Examiner*—Trang U Tran
(74) *Attorney, Agent, or Firm*—Lerner, David, Littenberg, Krumholz & Mentlik, LLP (57) ABSTRACT

A system processes an audio signal and a video signal by using different devices, thereby preventing a so-called lip sync error. The processing time (represented by processing-time information) from the start of reception of a supplied video signal in a video processor apparatus to the start of displaying a video corresponding to the video signal on a display screen of a display device is acquired in an amplifier device from the video processor apparatus through a control signal line. In accordance with the acquired processing time, a delay processor delays processing of an audio signal supplied from the delay processor.

2 Claims, 6 Drawing Sheets

FIG. 2

| SCAN MODE | VIDEO PROCESSING TIME |
|---|---|
| 480p | 10 MSEC |
| 720p | 20 MSEC |
| 1080i | 40 MSEC |
| ○○○ | ○○○ |

FIG. 3

PROCESS ON TV RECEIVER SIDE

FIG. 5

VIDEO-AUDIO PROCESSOR SYSTEM, AMPLIFIER DEVICE, AND AUDIO DELAY PROCESSING METHOD

CROSS-REFERENCE TO RELATED APPLICATIONS

The present application claims priority from Japanese Patent Application No. JP 2004-209658 filed on Jul. 16, 2004, the disclosure of which is hereby incorporated by reference herein.

BACKGROUND OF THE INVENTION

The present invention relates to a Video/audio processor system having, for example, a Video processor apparatus such as a television (TV) receiver, and an AV (audio/Video) amplifier. The invention further relates to an amplifier device and an audio delay processing method for use with the video/audio processor system.

For example, with an Video/audio terminal device of a TV conference system, when processing and playing back a Video signal and audio signal being sent, the amount of data and of the Video signal is greater than that of the audio signal, and also the processing is relatively complex, so that outputting of video is delayed with respect outputting of audio, whereby there occurs an offset between audio and video inherently required to be accurately synchronized, consequently generating non-synchronous (or, asynchronous) audio and Video (event of the unmatch between audio and Video character's mouth movements), i.e., so-called lip sync error.

To address the problem of such lip sync error, below-described Japanese Unexamined Patent Application Publication No. 07-059030 discloses a technique as briefed herebelow. According to the technique, in an apparatus for coding video signals and audio signals and produces outputs thereof, a necessary amount of delay of an audio signal from the coded state of the audio signal is set. Then, in accordance with the set amount of delay, the coded audio signal is delayed, whereby the video and audio signals are synchronized with one another and output. Then, the Video and audio signal are sent to a destination, thereby to prevent the occurrence of the lip sync error in a destination terminal device.

In recent years, configuration of so-called home theater systems has become popular. For example, the configuration of a home theater system can be configured by interconnecting a DVD (digital Versatile disc) player, an AV amplifier, and a TV receiver with a relatively large display screen.

In this case, the AV amplifier, which forms audio signals for supply to respective speakers corresponding to multiple channels, such as the 5.1 channels, supplies audio signals to a corresponding speaker, and synchronously supplies video signals to the TV receiver. In the TV receiver, the video signals from the AV amplifier are processed to form video signals for supply to a display device of, for example, an LCD (liquid crystal display), a PDP (plasma display panel), or CRT (cathode-ray tube), and the signals are supplied to the display device.

In this manner, an audio signal is processed by an AV amplifier, and a video signal is processed by a TV receiver; that is, the audio signal and the video signal are processed by different devices. As such, the time taken for the processing of the video signal in the TV receiver cannot be known in the AV amplifier. Thus, different from the case of the technique disclosed in the technique disclosed in the Japanese Unexamined Patent Application Publication No. 07-059030, the delay cannot be provided in the manner that the delay time of the audio signal is easily and automatically set.

In such a case as described above, if an AV amplifier capable of performing delay processing of an audio signal is used, a user has to manually set the amount of delay of the audio signal, and has to finely adjust the delay. However, in many cases, such setting and fine adjustment of the amount of delay of the audio signal are complex processing for an unskilled user, so that the amount of delay cannot be adjusted to satisfaction.

Of course, a case can be considered in which, to form a home theater system from the beginning, a set of a DVD player, AV amplifier, and TV receiver is purchased, and the adjustment is performed by, for example, a technical or service person stationed in an electrician store. However, it is time-consuming and burdensome to call for such a service person every time the adjustment is performed, and costs, such as service fees to be paid to the for the adjustment, can occur.

In view of the above, the present invention proposes a system, apparatus, and method capable of preventing so-called lip sync error in a system that uses different devices to process audio signals and video signals.

SUMMARY OF THE INVENTION

To this end, according to one embodiment of the invention, a video/audio processor system includes a video processor apparatus; and an amplifier device connected to the video processor apparatus through at least a video signal line and a control signal line. The video processor apparatus includes a video signal processor operable to process a video signal supplied through the video signal line to form a display video signal for supply to a display device; and a providing unit operable to provide processing-time information through the control signal line, the processing-time information representing a processing time taken from a start time of processing the video signal supplied through the video signal line in the video signal processor to a start time of displaying a video corresponding to the video signal on a display screen of the display device. The amplifier device includes an audio signal processor operable to process a supplied audio signal so that the audio signal is supplied to a speaker; an acquiring unit operable to acquire the processing-time information from the providing unit through the control signal line; and a delay processing unit operable to delay the audio signal to be supplied to the speaker for a time corresponding to the processing-time information.

According to the video/audio processor system in the embodiment, the video processor apparatus and the amplifier device are interconnected at least through the video signal line and the control signal line. The video processor apparatus is configured to be able to provide a processing time (represented by processing-time information) through the control signal line, the processing-time information representing the processing time taken from the start time of receiving the supplied video signal to the start time of displaying a video corresponding to the video signal on the display screen of the display device.

Preferably, in the video/audio processor system, the amplifier device acquires the processing-time information, which represents the processing time taken to process the video signal, from a providing unit through the control signal line, and a delay processing unit performs delay processing of an audio signal to be supplied to a speaker.

Thereby, audio being output from a speaker connected to an AV amplifier and video being displayed on the display device are synchronized with one another, thereby enabling a so-called lip sync error to be prevented.

In addition, according to the above-described video/audio processor system, the providing unit of the video processor apparatus preferably is a storing unit operable to store the processing-time information for a video signal corresponding to a scan mode; and the acquiring unit of the amplifier device preferably acquires the processing-time information from the storing unit through the control signal line.

In this case, in the video processing device, the processing-time information of a video signal corresponding to a scan mode is stored in the storing unit. Accordingly, the acquiring unit of the amplifier device is able to read and acquire the processing-time information from the storing unit of the video processor apparatus.

Thereby, the amplifier device acquires processing-time information by necessity from the video signal processor to cause an audio signal output from the own device to be delayed corresponding to the scan mode of the video signal supplied to the video processing device, and causes video and audio, which are to be inherently synchronized, to be synchronized. Consequently, the video and audio thus synchronized can be provided to a user.

Further, in the above-described video/audio processor system, the providing unit of the video processor apparatus preferably is able to acquire processing-time information of a video signal from the video signal processor; and the acquiring unit of the amplifier device preferably acquires the processing-time information from the providing unit through the control signal line.

In this case, the providing unit of the video processor apparatus securely acquires the processing-time information of the video signal from the video signal processor immediately after power-on, for example. Thereby, through communication with the acquiring unit of the amplifier device, the information is acquired by the acquiring unit of the amplifier device from the providing unit of the video processor apparatus through the control signal line.

Consequently, the amplifier device is able to acquire the processing-time information from the video processor apparatus when necessary. In addition, the providing unit of the video processor apparatus is able to directly acquire a processing state in the video signal processor, so that the audio signal can be delayed in the amplifier device in correspondence to a processing-objective video signal in the scan mode.

Thus, according to the embodiments of the invention, the video signal and the audio signal can easily be synchronized with one another between the video processor apparatus for processing the video signal and the amplifier device for processing the audio signal. Consequently, the so-called lip sync error can be prevented. Accordingly, the video and audio can be provided so as not to provide a user with an uncomfortable feeling.

Other and further objects, features and advantages of the invention will appear more fully from the following description.

DETAILED DESCRIPTION

An embodiment of a respective system, apparatus, and method according to the invention will be described herebelow with reference to the accompanying drawings.

Embodiments will be described herebelow with reference to a case where the present embodiment is adapted to a home theater system configured including a DVD player, an AV amplifier, and a TV receiver.

FIRST EMBODIMENT

Home Theater System

Figure 1:
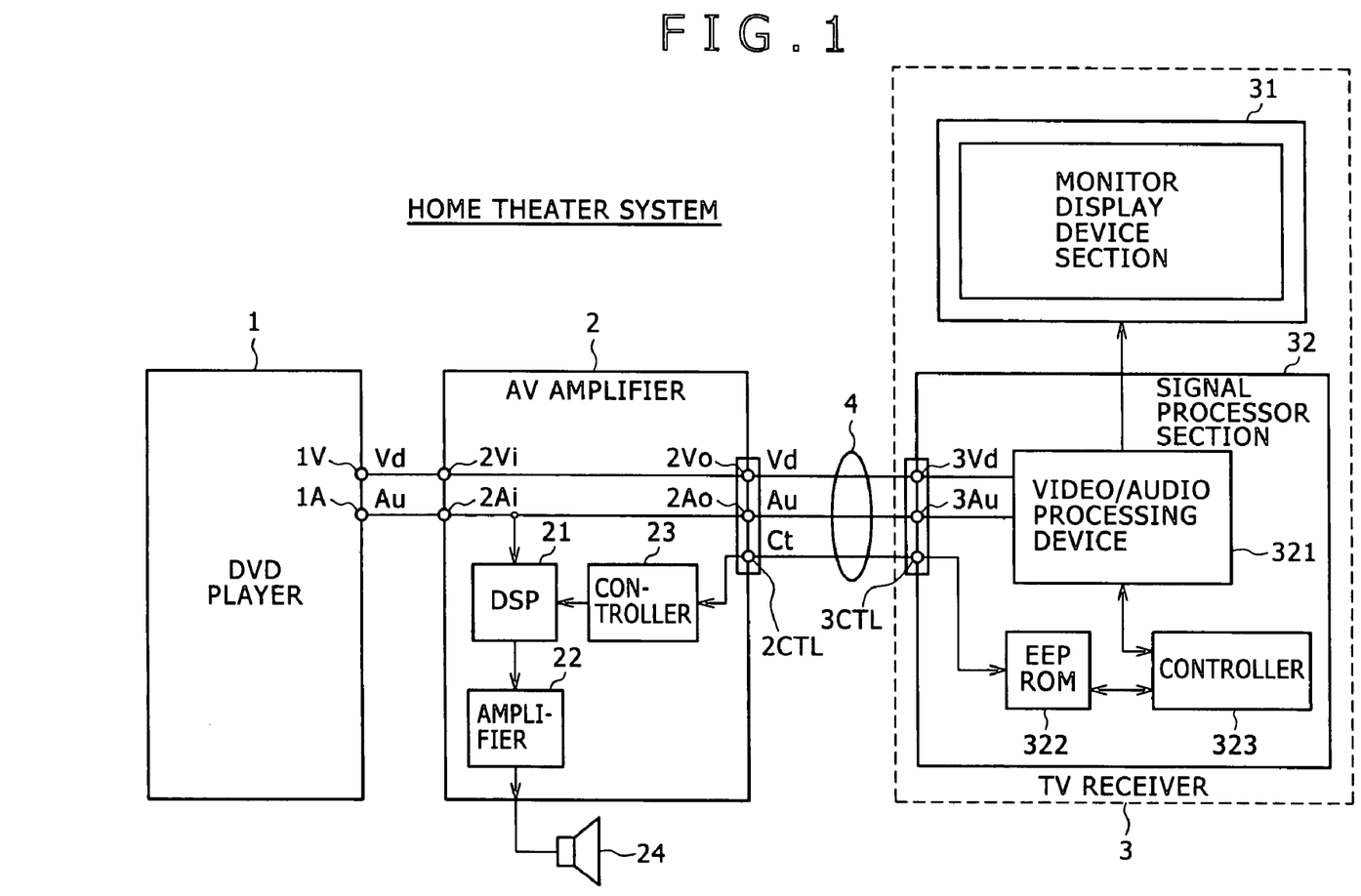
FIG. 1 is a block diagram descriptive of a home theater system to which an embodiment of a respective system, apparatus, and method according to the embodiment of the present invention is applied.

FIG. 1 is a block diagram descriptive of a home theater system in accordance with a first embodiment home theater system in accordance with a first embodiment. As shown in FIG. 1, home theater system in accordance with of the first embodiment is configured to include a DVD player 1, an AV amplifier 2, and a TV receiver 3. As described in more detail below, these devices are connected through predetermined digital interfaces.

The DVD player 1 reads a video signal and an audio signal representing, for example, the contents of a movie recorded in a DVD, thereby to form output the video and audio signals and then to output them. In this case, the video signals include those of various modes depending on scan lines/offsetting techniques, such as a 480P (progressive scan technique (sequential scan technique) on a basis of 480 effective scan lines), 720P (progressive scan technique on a basis of 720 effective scan lines), and 1080 i (interlacing scan technique on a basis of 1080 effective scan lines). The audio signals include audio signals of multiple channels, such as 2 channels, 4 channels, and 5.1 channels.

According to the embodiment, upon being supplied with a video signal and an audio signal from the DVD player 1, the AV amplifier 2, depending on the case, performs predetermined processing, such as decoding and encoding of the video and audio signals, and thereby supplies the signals to the backstage TV receiver 3. Of course, depending on interfaces, the decoding and encoding of a send-objective signal are not performed. As described below, the present embodiment uses digital interfaces complying with the HDMI (High-Definition Multimedia Interface) standards. With the HDMI-standard compliance digital interface, the decoding and encoding of send-objective signals are performed.

In addition, for the audio signals, the AV amplifier 2 forms audio signals of respective channels in correspondence to the number of own channels of the audio signals, and performs processing such as amplification of the signals, thereby to supply the signals to speakers connected to itself.

As described below, the TV receiver 3 includes a monitor display device section 31 and speakers (not shown). Upon being supplied with the video and audio signals from the amplifier 2, the TV receiver 3 decodes the encoded signals. Then, for the video signals, the TV receiver 3 forms video signals for supply to the monitor display device section 31 of its own, and supplies the signals to the monitor display device section 31 of its own. For the audio signals, the TV receiver 3 forms audio signals for supply to a speaker provided in itself, and supplies the signals to the monitor display device section 31 of its own.

In the present embodiment, primarily, outputs from the speakers connected to the AV amplifier 2 are listened. As such, audio systems such as a speaker of the TV receiver 3 (such as a built-in speaker of the TV receiver 3) are not shown in FIG. 1, and detailed descriptions thereof are omitted herefrom.

Thereby, audio corresponding to the audio signal output from the DVD player 1 is output from the speaker connected to each (respective channel) of the multiple channels connected to the AV amplifier 2 and from the speaker of the TV receiver 3. Concurrently, video corresponding to the video signal output from the DVD player 1 is displayed on a display screen of the monitor display device section 31 of the TV receiver 3. Thereby, the video and audio of the contents, such as a movie, recorded on the DVD are played back to be viewable and audible.

In the embodiment, at least the AV amplifier 2 and TV receiver 3 are interconnected using an HDMI-standard conformance digital interface 4. The HDMI standards are digital interface standards for next-generation TVs where in the functionality of DVIs (digital visual interfaces), which are used in a large number of adaptations such as personal-computer displays, are added to those for use as home appliances (for AV (audio/visual)) by maintaining lower compatibility. With an HDMI-standard conformance digital interface, a video line (video signal line), an audio line (audio signal line), and a control line (control signal line) can be connected by a single connector.

More specifically, with an HDMI-standard compliance digital interface, signal lines are not connected independently of one another, but, an HD (high definition) video, multichannel audio signal, and control signal can be sent through a single connector. This produces the advantage of facilitating cable routing. According to the HDMI standards, the data transfer rate is 5G bits/sec at maximum. In addition, the adaptation is extended also to an HDCP (high-bandwidth digital content protection) technique, which is a digital-image signal encoding technique.

According to the home theater system of the first embodiment, the video signal processing in the TV receiver 3 takes a longer time in comparison to the audio signal processing in the AV amplifier 2. Consequently, error (offset) can occur in the synchronization (of output timing) between audio output from the speaker connected to the AV amplifier 2 and video displayed on the display section of the monitor display device 31 of the TV receiver 3, providing an audience (user) with uncomfortable feeling.

As such, in the home theater system according to the first embodiment is arranged as follows. In the TV receiver 3, the supplied video signal is processed, information (information of a delay time characteristic) of a processing time taken to the instance of displaying of the video corresponding to the video signal on the display screen of the monitor display of the monitor display device section 31 is acquired, and the information is retained. In the AV amplifier 2, in the event of outputting of a video signal, information of the processing time for the video signal is acquired from the TV receiver 3 through the control line of the HDMI-standard compliance digital interface, and the audio signal for supply to the respective speaker is delayed corresponding to the acquired information of the processing time, thereby preventing the synchronization offset between the video and the audio. (Configurations and Operations of AV Amplifier 2 and TV Receiver 3).

First, the TV receiver 3 positioned in a downstream (downside) end portion will be described herebelow. As shown in FIG. 1, the TV receiver 3 is, broadly, configured having the monitor display device section 31 and a signal processor section 32. The monitor display device section 31 is a section that has a display device of, for example, an LCD (liquid crystal display), PDP (plasma display panel), CRT (cathode-ray tube), or organic EL (electro luminescence) display containing a relatively large display screen.

The signal processor section 32 has an HDMI-standard compliance connection end that includes a video signal input end 3Vd, an audio signal input end 3Au, and a control signal input/output end 3CTL; a video/audio processing device 321; an EEPROM (electrically erasable and programmable ROM) 322; and a controller 323. In this case, the EEPROM 322 is provided for use in, for example, a case where the TV receiver 3 indicates an own video receiving capacity to a sender side of, for example, video signals and audio signals.

The AV amplifier 2, which is a signal sender side, performs look-up access to information stored in the EEPROM 322 of the TV receiver 3, thereby to determine an allowable capacity of the TV receiver 3 and to supply, for example, video signals and audio signals to the TV receiver 3. Ordinarily, the EEPROM 322 of the TV receiver 3 is written (programmed) only with the contents of, for example, video signals and audio signals per se.

However, according to the first embodiment, the TV receiver 3 records processing-time information of the time taken from the instance of reception of a supplied video signal into the EEPROM 322 of the TV receiver 3 to the instance of displaying of video corresponding to the signal on the display screen of the monitor display device section 31 (i.e., information (delay time characteristic) of a processing time taken for processing of the audio signal and related to a delay time), thereby to provide the processing-time information of the video signal to the AV amplifier 2 and to cause a delay in the processing of the audio signal, whereby makes it possible to prevent the so-called lip sync error with which an offset occurs between playback video and audio.

The TV receiver 3 according to the first embodiment performs operation as described herebelow. The controller 323 is a microcomputer including, for example, a CPU (central processing unit), a ROM (read-only memory), and a RAM (random access memory), and controls individual sections of the signal processor section 32. As already described above, the controller 323 communicates with the video/audio processing device 321 and acquires information representing the processing time taken for the video signal processing, and records the information into the EEPROM 322, which is a nonvolatile memory.

The video/audio processing device 321 acquires the processing time taken from the instance of reception of a supplied processing-objective video signal in correspondence to the scan mode of the video signal to the instance of displaying of video corresponding to the signal on the display screen of the monitor display device section 31.

Figure 2:
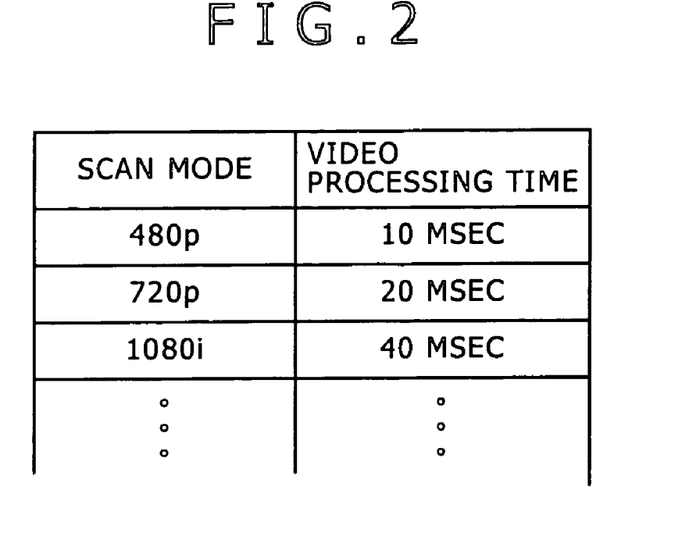
FIG. 2 is a view descriptive of scan modes and video signal processing times (delay time characteristics)

FIG. 2 is a view descriptive of scan modes and video signal processing times. As shown in FIG. 2, in the case of a 480P video signal, the time taken from the instance of reception the supply of the video signal to the instance of displaying of an image correspond to the video signal on the monitor screen of the monitor display device section 31 is said to be only about 10 msec (milliseconds).

In the case of a 720P video signal, the time taken from the instance of reception of the supply of the video signal to the instance of displaying of an image (video) corresponding to the video signal on the display screen of the monitor display device section 31 is said to be about 20 msec. In the case of a 1080P video signal, the time taken from the instance of receiving the supply of the video signal to the instance of displaying an image (video) corresponding to the video signal on the display screen of the monitor display device section 31 is said to be about 40 msec.

Information representing the processing time taken for the processing of each of these video signals is, as described above, acquired by the controller 323 from the immediately after power-on of the TV receiver 3, and is then recorded into the EEPROM 322. Thereby the AV amplifier 2 becomes able to acquire the time (processing time) taken for the video signal processing in the TV receiver 3.

In the TV receiver 3, a video signal received through a video line Vd and an input end 3Vd and an audio signal received through audio line Au and an input end 3Au are supplied to the video/audio processing device 321. The respective video signal and audio signals are decoded corresponding to formats independent of one another, whereby an output video signal and output audio signal are formed.

The output video signal is supplied to the monitor display device section 31, and video corresponding to the output video signal is displayed on the display screen of the monitor display device 31. In addition, the output audio signal is supplied to the speaker of the TV receiver 3, and audio corresponding to the output audio signal is output from the speaker.

The AV amplifier 2 positioned on the upstream side (upside) will be described herebelow. As shown in FIG. 1, the AV amplifier 2 has a video signal input end 2Vi; an audio signal input end 2Ai; a DSP 21 (digital signal processor); an amplifier section 22 ("AMP" in FIG. 1); a controller 23 for controlling individual sections of the AV amplifier 2; and an HDMI-standard compliance connection end including a video signal output end 2Vo, an audio signal output end 2Ao, and a control signal input/output end 2CTL.

A speaker 24 is connected to the amplifier section 22. Although FIG. 1 shows only one each of the amplifier section 22 and speaker 24, the AV amplifier 2 according to the embodiment is capable of processing so-called multiple-channel audio signals, so that it is provided with multiple amplifier sections 22 and multiple speakers 24 corresponding to individual channels.

The AV amplifier 2 outputs through the output end 2Vo a video signal received through input end 2Vi, outputs through the output end 2Ao an audio signal received through the input end 2Ai, supplies the audio signal to the DSP21, performs decoding corresponding to the format of the audio signal, forms a respective multichannel audio signal, supplies the signal to the respective corresponding speaker 24 through the respective channel amplifier section 22.

In this case, before sending of, for example, the video signal and the audio signal to the TV receiver 3, the controller 23 performs lookup access to the information in the the EEPROM 322 of the TV receiver 3 through a control line Ct interconnecting the own control signal input/output end 2CTL and input/output end 3CTL of the TV receiver 3, and reads out information representing the processing time for the video signal from the EEPROM 322 of the TV receiver 3.

In this state, as having already been supplied with the video and audio signals from the DVD player 1, the AV amplifier 2 knows also, for example, the operation mode of the video signal being supplied to the TV receiver 3. As such, the controller 23 of the AV amplifier 2 is controlled so that outputting of the audio signal is delayed for a time corresponding to the processing time for the video signal being supplied to the TV receiver 3.

Thereby, audio output from the speaker connected to the AV amplifier 2 matches in timing video displayed on the display screen of the monitor display device section 31 of the TV receiver 3. Consequently, without causing the so-called lip sync error, the contents of the movie composed of the image (video) and audio can be played back, thereby enabling good viewing and listening.

Figure 3:
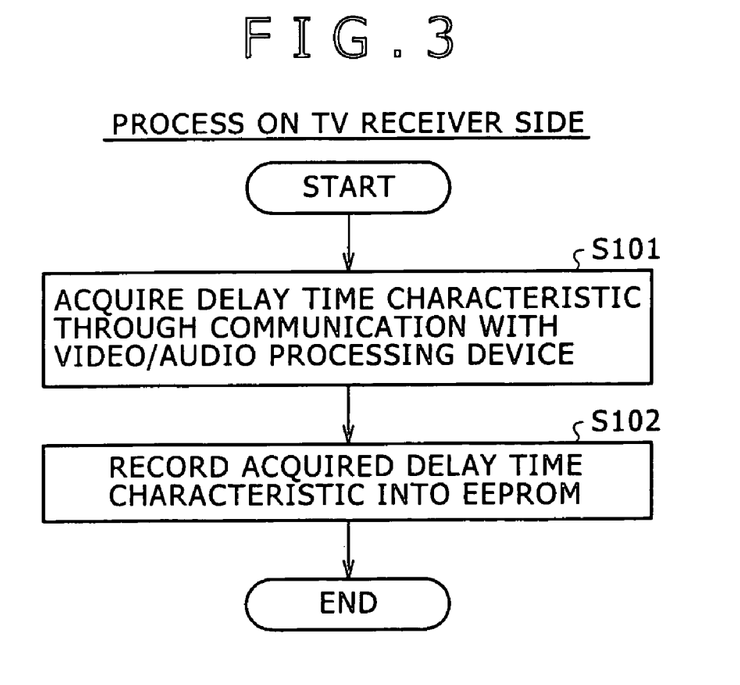
FIG. 3 is a flow diagram descriptive of a process immediately after power-on of a TV receiver (3) shown in FIG. 1.
Figure 4:
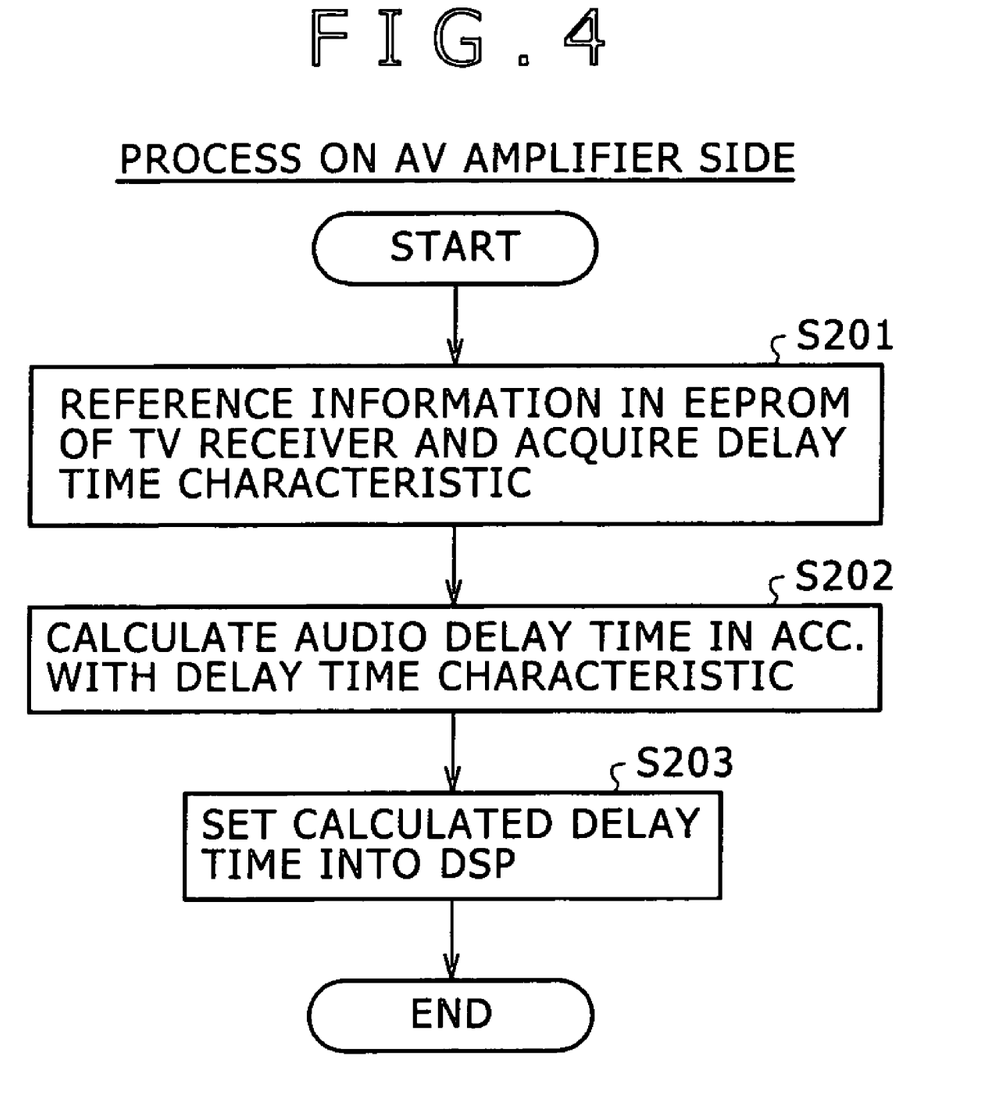
FIG. 4 is a flow diagram descriptive of a process being executed immediately before sending of a signal of an AV amplifier (2) shown in FIG. 1.

The respective operations of the AV amplifier 2 and the TV receiver 3 will be collectively described herebelow with reference to flow diagrams of FIGS. 3 and 4. First, the operation on the side of the TV receiver 3 will be described.

FIG. 3 is a flow diagram descriptive of a process being executed immediately after power-on of the TV receiver 3. Upon power-on of the TV receiver 3, the controller 323 communicates with the video/audio processing device 321, thereby to acquire processing-time information of the time taken in the TV receiver 3 from the instance of reception of a supplied video signal to the instance of displaying of video corresponding to the signal on the display screen of the monitor display device section 31 (i.e., information (delay time characteristic) of a processing time taken for processing of the audio signal and related to a delay time of the video) (step S101). Then, the operation records the information into an area of a specified address of the EEPROM 322, and then the process shown in FIG. 3 terminates.

Operation on the side of the AV amplifier 2 will be described hereafter. FIG. 4 is a flow diagram descriptive of a process being executed in the AV amplifier 2 immediately before the start of sending an audio signal to the TV receiver 3.

Before sending of a video signal to the TV receiver 3, the controller 23 performs lookup access to information stored in the EEPROM 322 of the TV receiver 3 through the control line Ct, and thereby acquires information (information representing a delay time characteristic) representing a processing time taken to process the video signal (step S201). Then, in accordance with the acquired information representing the delay time characteristic, the controller 23 calculates a delay time of an audio signal (step S202), and sets the time into the DSP 21 (step S203).

Thereby, an output timing of audio being output from the speaker 24 connected to the AV amplifier 2 is synchronized with a display timing of the video being displayed on the display screen of the monitor display device section 31 of the TV receiver 3. This consequently enables preventing the so-called lip sync error between the output audio and video.

As is shown in FIG. 3, in the first embodiment, description has been made such that immediately after the power-on of the TV receiver 3, the controller 323 of the TV receiver 3 acquires, as the delay time characteristic, the time taken from the instance of reception of the supplied video signal from the video/audio processing device 321 to the instance of displaying of the video corresponding to the video signal, and then the information is stored into the EEPROM 322. However, the invention is not limited to the described manner.

Suppose that per-scan-mode delay characteristic is preliminarily known. In this case, the operation may of course be such that the information representing the delay characteristic is retained in, for example, a register or memory provided in the controller 323, and the information is written (programmed) into an area of a predetermined address of the EEPROM 322. Alternatively, the information is programmed from the beginning into an area of a predetermined address of the EEPROM 322.

Thus, ordinarily, information, such as sequentially applicable video signal resolutions, aspect ratios, and scan modes in a TV receiver are stored and retained in an EEPROM of the TV receiver connected through an HDMI-standard compliance digital interface. However, an area uniquely usable by a vendor is also provided in the EEPROM, and the areas used to enable the processing-time information of video signals in the TV receiver 3 to be used accurately and timely to the AV amplifier 2.

SECOND EMBODIMENT

Home Theater System

Figure 5:
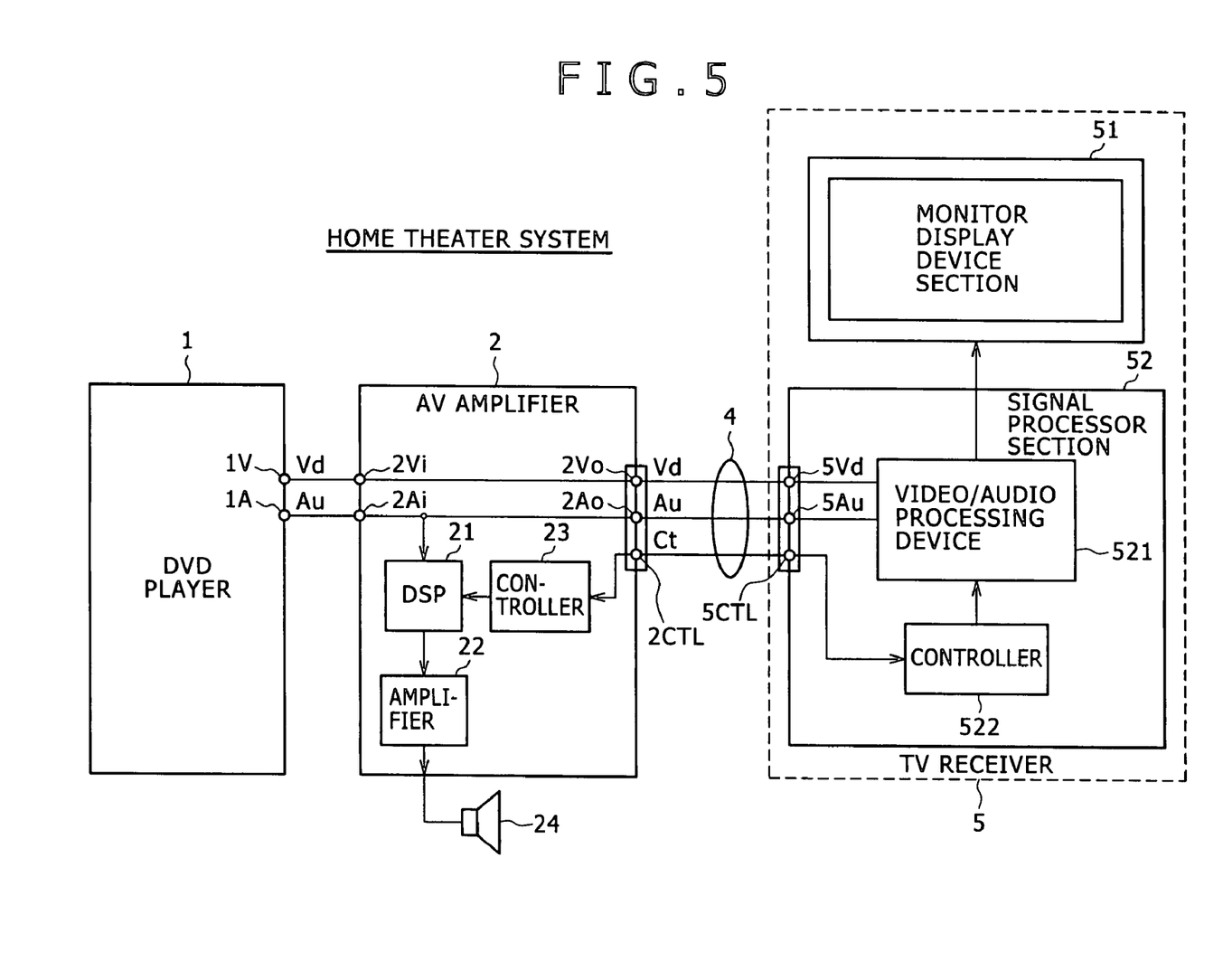
FIG. 5 is a block diagram descriptive of a home theater system employing another embodiment of a respective system, apparatus, and method according to the embodiment of the present invention.

A system, apparatus, and method according to a second embodiment of the invention will be described herebelow. FIG. 5 is a block diagram descriptive of a home theater system according to the second embodiment. As shown in FIG. 5, similarly as the home theater system according to the first embodiment shown in FIG. 1, the home theater system according to the second embodiment is configured to include the DVD player 1, the AV amplifier 2, and a TV receiver 5.

However, different from the TV receiver 3 used in the home theater system according to the first embodiment, the TV receiver 5 for use in the home theater system according to the second embodiment does not have the EEPROM 322 serving to provide the information to the AV amplifier 2. In the configuration of the second embodiment, communication is directly performed between a controller 522 of the TV receiver 5 and the controller 23 of the AV amplifier 2.

Thus, except that the TV receiver 5 does not have the EEPROM, the home theater system according to the second embodiment is configured similar to the home theater system according to the first embodiment. In FIG. 5 showing the home theater system according to the second embodiment, portions having configurations identical or similar to those of the home theater system according to the first embodiment are designated by the same or similar reference characters, and detailed description thereof are omitted herefrom.

Also in the home theater system according to the second embodiment, the AV amplifier 2 and the TV receiver 5 are interconnected through the HDMI-standard compliance digital interface 4.

That is, the TV receiver 5 is, broadly, configured having a monitor display device section 51 and a signal processor section 52. Similarly as the monitor display device section 31 of the TV receiver 3 according to the first embodiment, the monitor display device section 51 is a section that has a display device of, for example, an LCD (liquid crystal display), PDP (plasma display panel), CRT (cathode-ray tube), or organic EL (electro luminescence) display containing a relatively large display screen.

The signal processor section 52 has an HDMI-standard compliance connection end that includes a video signal input end 5Vd, an audio signal, an input end 5Au, and a control signal input/output end 5CTL; a video/audio processing device 521; and a controller 522 that controls individual sections of the TV receiver 5.

The connection end including the input ends 5Vd and 5Au and input/output end 5CTL of the TV receiver 5 shown in FIG. 1 and the connection end including the input ends 3Vd and 3Au and input/output end 3CTL of the TV receiver 3 shown in FIG. 1 are connection ends are HDMI-standard compliance digital interfaces configured similar to each other. In addition, the video/audio processing device 521 of the TV receiver 5 shown in FIG. 5 is configured similarly as the video/audio processing device 321 of the TV receiver 3 shown in FIG. 1.

In the home theater system according to the second embodiment, upon power-on, the controller 522 acquires a processing time (a processing time taken for processing of the audio signal and a delay time (delay time characteristic) of video) taken from the instance of reception of a supplied video signal in the TV receiver 5 from the video/audio processing device 521 to the instance of displaying of video corresponding to the signal on the display screen of the monitor display device section 51.

Before sending of, for example, the video signal and the audio signal to the TV receiver 5, the controller 23 of the AV amplifier 2 communicates with the controller 522 of the TV receiver 5 through the control line Ct and acquires the delay time characteristic of the TV receiver 5. Then, in accordance with the delay time characteristic acquired from the TV receiver 5, the controller 23 of the AV amplifier 2 obtains the delay time of the audio signal and sets the delay time into the DSP 21. Thereby, processing is performed so that the audio signal is delayed corresponding to the time taken to process the video signal in the TV receiver 5.

Thereby, an output timing of audio being output from the speaker 24 connected to the AV amplifier 2 is synchronized with a display timing of the video being displayed on the display screen of the monitor display device section 51 of the TV receiver 5. This consequently enables preventing the so-called lip sync error between the output audio and video.

Figure 6:
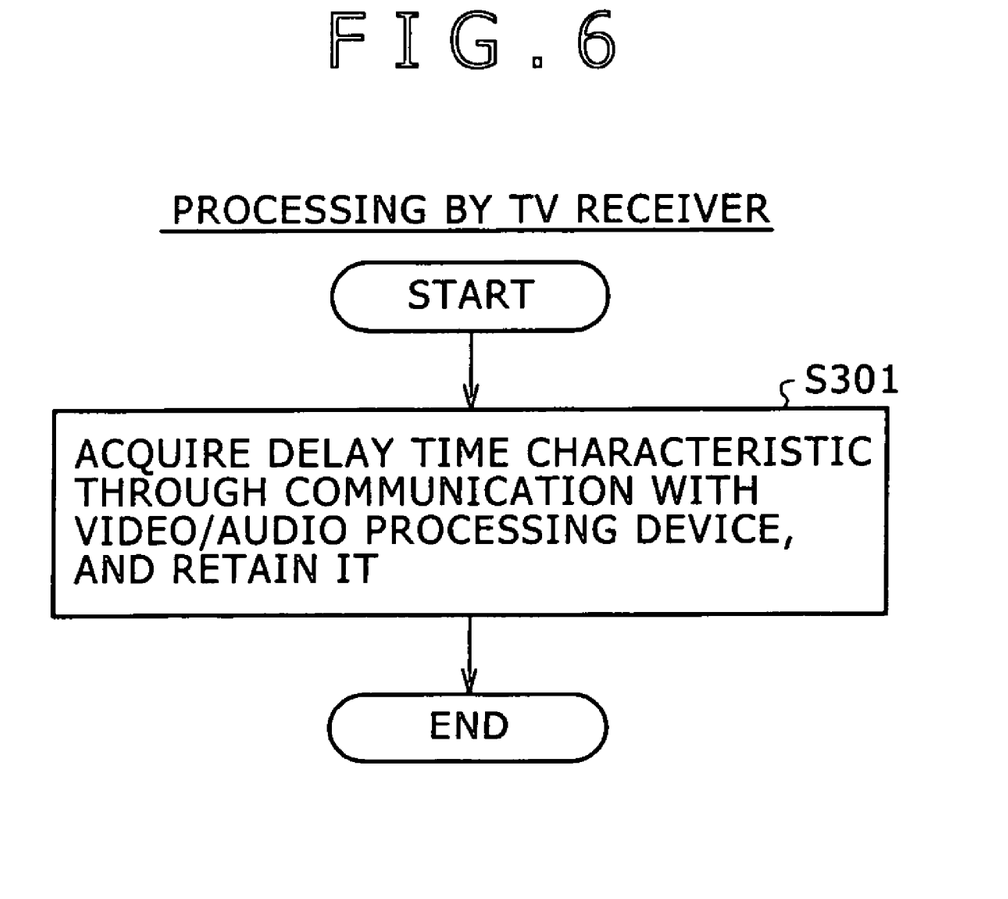
FIG. 6 is a flow diagram descriptive of a process immediately after power-on of a TV receiver (5) shown in FIG. 5.
Figure 7A:
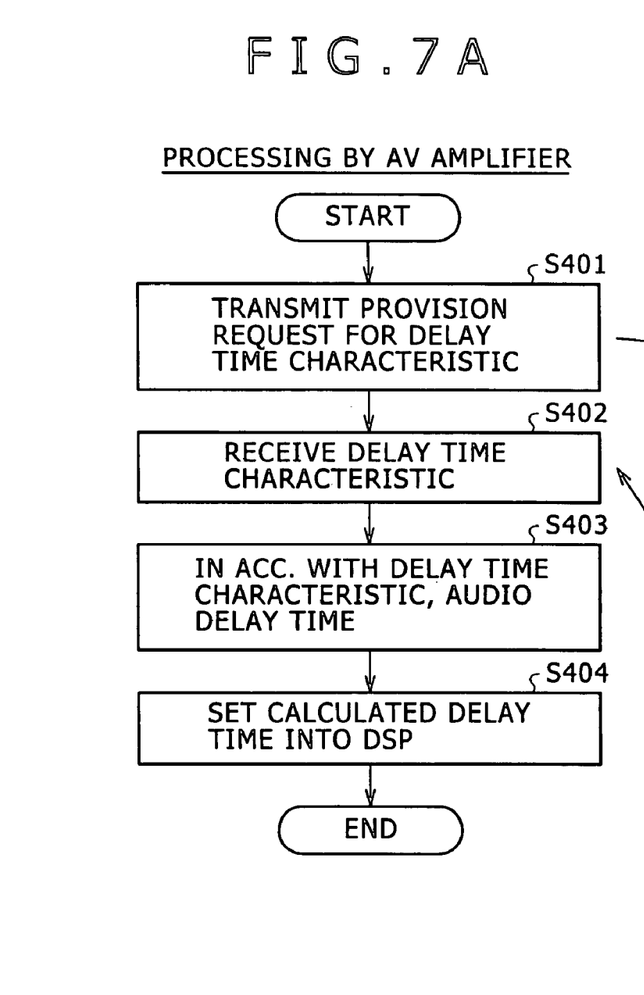
FIGS. 7A and 7B are flow diagrams descriptive of a pre-delay process of an audio signal which process is performed by the AV amplifier (2) and TV receiver (5) shown in FIG. 5.
Figure 7B:
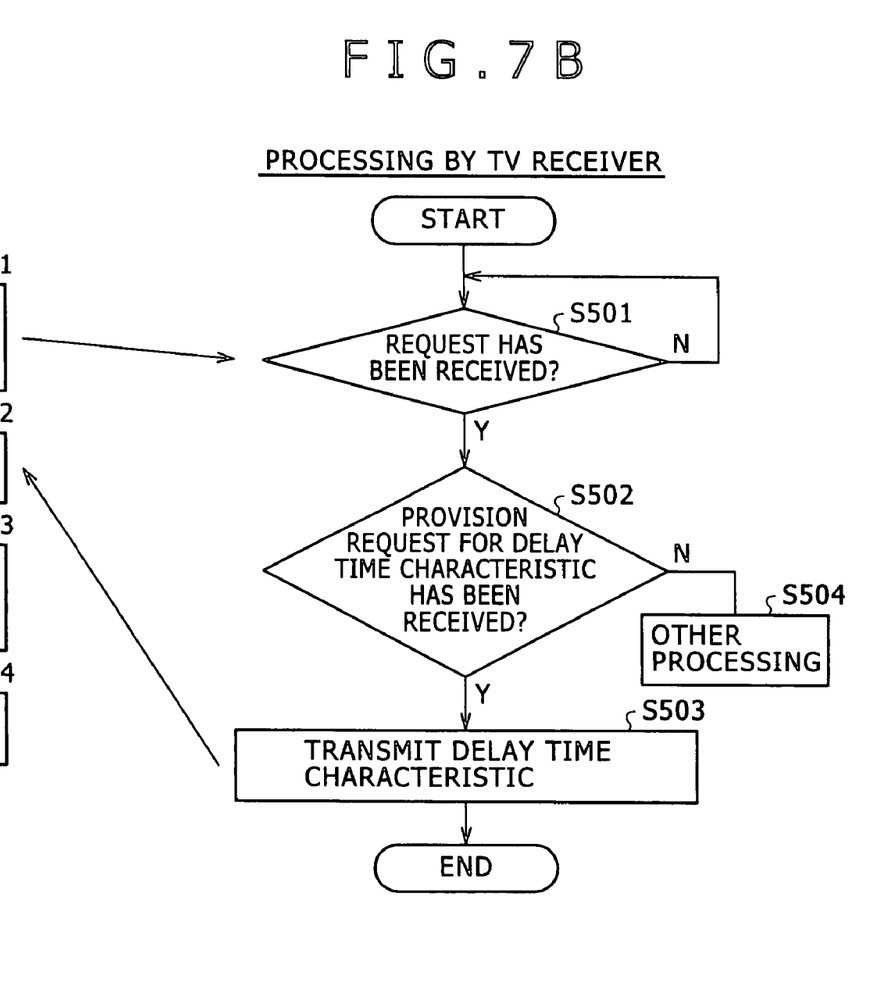

The respective operations of the AV amplifier 2 and the TV receiver 5 will be collectively described herebelow with reference to flow diagrams of FIGS. 6 and 7. First, operation of the TV receiver 5 immediately after the power-on will be described. FIG. 6 is a flow diagram descriptive of a process being executed immediately after power-on of the TV receiver 5. Upon power-on of the TV receiver 5, the controller 522 starts the execution of the process shown in FIG. 6.

The controller 522 communicates with the video/audio processing device 521, thereby acquires processing-time information representing the processing time of a video signal (i.e., information representing the delay time characteristic), and retains in, for example, a register or memory of its own (step S301) to be able to responsive to a request from the AV amplifier 2.

A pre-delay process of an audio signal will now be described herebelow. FIGS. 7A and 7B are flow diagrams descriptive of a pre-delay process being executed between the AV amplifier 2 and the TV receiver 5. In particular, FIG. 7A is a flow diagram of an operation of the AV amplifier 2, and FIG. 7B is a flow diagram of an operation of the TV receiver 5.

In the second embodiment, before sending of a video signal and an audio signal to the TV receiver 5, the controller 23 of the AV amplifier 2 first sends a provision request for information representing the delay time characteristic (audio-signal processing time) to the controller 522 of the TV receiver 5 through the control line Ct (step S401).

In the controller 522 of the TV receiver 5, the process shown in FIG. 7B is executed after the process shown in FIG. 7, and the process enters a standby state awaiting a request from the AV amplifier (step S501). In determination processing of step S501, if it is determined that the controller 522 of the TV receiver 5 has received a request from the AV amplifier 2, then it is further determined whether the received request is a provision request for the delay time characteristic (information representing the processing time for the video signal (step S502).

In determination processing of step S502, if it is determined that the received request is the provision request for the delay time characteristic, then the controller 522 of the TV receiver 5 returns own-retaining information representing the delay time characteristic to the requesting-source AV amplifier 2 through the control line Ct (step S503). Then the controller 522 if the TV receiver 5 terminates the process shown in FIG. 7(B).

In determination processing of step S502, if it is determined that the received request is not the provision request for the delay time characteristic, the controller 522 of the TV receiver 5 performs other processing in response to a request received from the AV amplifier 2 (step S504), and then terminates the process shown in FIG. 7(B).

In the present case, the delivery of the delay characteristics in response to the request from the AV amplifier 2 is shown. However, the delivery method may of course be such that, even when such a request from the AV amplifier 2 does not occur, the TV receiver spontaneously performs notification at power-on time upon, upon a change in the delay characteristics, or the like. The delay-characteristic data to be delivered may be the delay time itself or any other element from which the delay time can be predicted in the AV amplifier 2. For example, the information may be any of various types of information, such as information representing the format of the processing-objective video signal or code information corresponding to the delay time, from which an appropriate delay time of the audio signal can be determined in the AV amplifier 2.

On the other hand, the controller 23 of the AV amplifier 2 receives the information representing the delay time characteristic that has been sent from the controller 522 of the TV receiver 5 through the control line Ct (step S402). Then, in accordance with the received delay time characteristic, the controller 23 calculates a delay time for delaying the audio (step S403). The delay time calculated at step S403 is set into the DSP 21 (step S404) to thereby cause a delay of the audio signal, and then the process of FIG. 7(A) is terminated.

Thereby, an output timing of audio being output from the speaker 24 connected to the AV amplifier 2 is synchronized with a display timing of the video being displayed on the display screen of the monitor display device section 51 of the TV receiver 5. This consequently enables preventing the so-called lip sync error between the output audio and video.

In the home theater system according to the second embodiment, the controller 522 of the TV receiver 5 is able to directly acquire a processing state from the video/audio processing device 521, and is able to notify the state to the AV amplifier 2 through the control line Ct.

Thus, in the preliminary processing, at least the supplied video signal is received from the AV amplifier 2, the information representing the processing time corresponding to the scan mode of the video, and the information is provided to the controller 23 of the AV amplifier 2. Accordingly, without performing each time the process of recognizing the scan mode of the video signal being supplied to the TV receiver 5, the AV amplifier 2 is able to acquire the information (delay-characteristic information) related the processing time for the video signal which information is to be acquired in the TV receiver 5, and thereby performs the delay processing corresponding to thereto on the audio signal, thereby enabling preventing the lip sync error between the video and audio.

As is shown in FIG. 6, also in the second embodiment, description has been made such that immediately after the power-on of the TV receiver 5, the controller 522 of the TV receiver 5 acquires, as the delay time characteristic, the time taken from the instance of reception of the supplied video signal from the video/audio processing device 321 to the instance of displaying of the video corresponding to the video signal, and then the information is retained. However, the invention is not limited to the described manner. When per-scan-mode delay characteristic is preliminarily known, the operation may of course be such that the information representing the delay characteristic is retained in, for example, a register or memory provided in the controller 522.

Thus, the two signals to inherently be synchronized can be processed as in a manner that a control line (control signal line) for used in such a case where, inherently, inter-device power-on/off is synchronized is used, and, for example, the time taken for processing is communicated between inter-device controllers through the control line to thereby adjust the total processing time.

In the above-described embodiments, description has been made with reference to case where the HDMI-standard compliance digital interface is used for the connection at least between the AV amplifier 2 and the TV receiver 5 and between the AV amplifier 2 and the TV receiver 5. However, the invention is not limited thereto. For example, the video signal may be connected to, for example, an HDMI or DVI digital interface or an existing analog interface such as a component terminal or composite terminal; and the audio signal may be connected to an HFMI, OPT (TOS link), analog pin jack, stereo cable, or monaural cable.

The connection between the EEPROM of the TV receiver and the controller of the AV amplifier 2 and connection between the controller of the TV receiver and the controller of the AV amplifier 2 may be made using, for example, an I2C (inter-integrated circuit) bus, thereby to enable sending a control signal other than the video signal, audio signal, or the like.

Of course, other standard signal lines may be used for the connection. In essence, in such a case where an interface using a control signal line to make inter-device connection for transmission/reception of a control signal other than main signal transmission lines that is used to process, for example, video and audio signals is used to interconnect an AV amplifier and a video processing device such as a TV receiver, the present invention can be adapted.

In the above-described embodiments, description has been made with reference to the cases where the AV amplifier 2 and the TV receiver 5 are interconnected and the AV amplifier 2 and the TV receiver 5. However, the TV receiver may be of any type permitting an AV amplifier to be connected. As such, the invention can be adapted even in a case where a TV receiver having a tuner function or a TV receiver not having a tuner function, that is, a so-called monitor receiver is connected to the AV amplifier 2.

Further, the invention can also be adapted in a case where interconnection is made between a video processor apparatus and an AV amplifier, the video processing device being a digital-broadcast receiving tuner device called, for example, an STB (set-top box) or IRD (integrated receiver decoder) that forms and supplies video signals to a monitor display device, that permits an AV amplifier to be connected and that forms and supplies display videos to a monitor receiver such as a TV receiver. That is, the invention can be adapted to a case where an AV amplifier for processing audio signals is connected to various video processing devices for processing video signals.

Further, in the above-described embodiments, although description has been made with reference to case where the delay processing of the audio signal is performed in the DSP of the AV amplifier 2, the invention is not limited thereto. For example, a delay processor circuit is provided in a backstage of the DSP 21, thereby to cause the audio signal processed in the DSP 21 to be delayed for a time provided in accordance with control from the controller 23.

Further, a delay processor circuit may be provided in a forestage of the DSP 21. In this case, the amount of delay of the audio signal may preferably be set in consideration of the delay-characteristic information from the controller 23 and the time taken for processing the audio signal.

It should be understood by those skilled in the art that various modifications, combinations, sub-combinations and alterations may occur depending on design requirements and other factors insofar as they are within the scope of the appended claims or the equivalents thereof.

The invention claimed is:

1. A video/audio processor system, comprising:
   a video processor apparatus; and
   an amplifier device connected to the video processor apparatus through at least a video signal line and a control signal line;
   the video processor apparatus including:
      a video signal processor operable to process a video signal supplied through the video signal line to form a display video signal for supply to a display device, in which the video signal has a scan mode associated therewith; and
      a providing unit operable to store predetermined processing-time information representative of a number of processing times and a number of corresponding scan modes in which each processing time has a corresponding scan mode associated therewith and to provide information representative of a respective processing time corresponding to the scan mode of the respective video signal through the control signal line, the processing-time information representing a processing time taken from a start time of processing the video signal supplied through the video signal line in the video signal processor to a start time of displaying a video corresponding to the video signal on a display screen of the display device; and
   the amplifier device including:
      an audio signal processor operable to process a supplied audio signal so that the audio signal is supplied to a speaker;
      an acquiring unit operable to acquire the information representative of the respective processing time corresponding to the scan mode of the respective video signal from the providing unit through the control signal line; and
      a delay processing unit operable to delay the audio signal to be supplied to the speaker for a time corresponding to the information representative of the respective processing time corresponding to the scan mode of the respective video signal.

2. An audio delay processing method in a video/audio processor system in which a video processing device and an amplifier device are interconnected at least through a video signal line and a control signal line, the method comprising:
   storing predetermined processing-time information representative of a number of processing times and a number of corresponding scan modes in which each processing time has a corresponding scan mode associated therewith and providing information representative of a respective processing time corresponding to the scan mode of the respective video signal from the video processing device to the amplifier device through the control signal line, the processing-time information representing a processing time taken from a start time of processing a video signal supplied through the video signal line to a start time of displaying a video corresponding to the video signal on a display screen of the video processing device; and
   acquiring the information representative of the respective processing time corresponding to the scan mode of the respective video signal in the amplifier device through the control signal line; and
   delaying an audio signal to be supplied to a speaker for a time corresponding to the information representative of the respective processing time corresponding to the scan mode of the respective video signal acquired in the acquiring step.

* * * * *